United States Patent [19]

Boyer

[11] 4,312,025
[45] Jan. 19, 1982

[54] MAGNETIC VARIABLE CAPACITOR
[75] Inventor: Lawrence A. Boyer, Princeton, N.J.
[73] Assignee: RCA Corporation, New York, N.Y.
[21] Appl. No.: 967,095
[22] Filed: Dec. 6, 1978
[51] Int. Cl.³ .......................... H01G 7/00; H01G 5/16
[52] U.S. Cl. ..................................... 361/289; 361/290
[58] Field of Search ............... 361/291, 289, 292, 290, 361/279

[56] References Cited
U.S. PATENT DOCUMENTS
3,020,455  2/1962  Reifez ................................. 361/289

Primary Examiner—Elliot A. Goldberg
Attorney, Agent, or Firm—Samuel Cohen; H. Christoffersen; William Squire

[57] ABSTRACT

A capacitor comprises a resilient strip of magnetic material, such as steel, a strip of non-magnetic material such as brass and a layer of insulation between the two. An end portion of the resilient strip is movable between a position substantially parallel and close to the brass strip and a position as an angle to and spaced further from the brass strip. A magnetic coil or permanent magnet controls the position of the movable end portion of the resilient strip relative to the brass strip to thereby control the capacitance between the two strips.

13 Claims, 3 Drawing Figures

MAGNETIC VARIABLE CAPACITOR

The present invention relates to capacitor structures.

In high voltage high frequency circuits capacitors are placed in close proximity to other circuit components. Some circuits may require infrequent small capacitance adjustments and others more frequent variable adjustments over a range of capacitance. These adjustments are made to tune the circuits. Such adjustments are made manually and, due to the presence of closely spaced high voltage components, may be hazardous.

These problems are overcome by an embodiment of the present invention which includes a strip of conductive material, a resilient strip of magnetic material which is fixed at one end portion relative to the strip of conductive material and which is free to move at its other end portion and a layer of electrically insulating material between the two. The two strips form a capacitor whose capacitance is controlled by a magnetic field.

Figure 1:
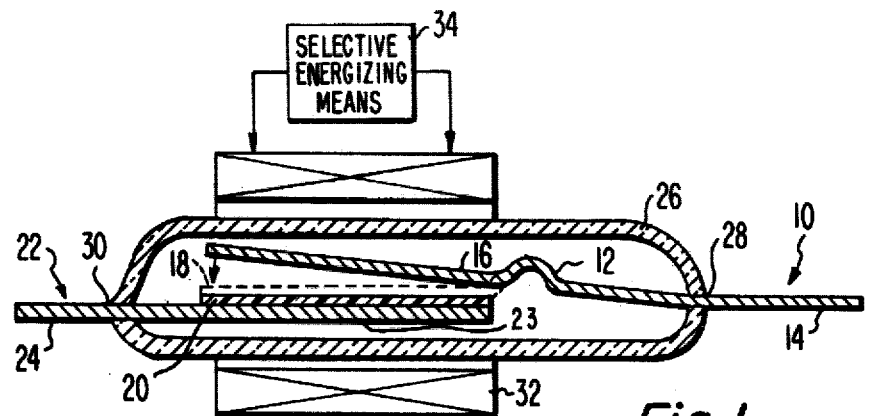
FIG. 1 is a sectional view and block diagram of a capacitor in accordance with one embodiment of the present invention.

In FIG. 1 a strip 10 of magnetic flexible spring steel is formed of relatively thin sheet material having any given desired width. By way of example, the material can have a thickness of 0.006 inches. The strip 10 is an elongated member having a U-shaped bight 12 formed therein serving as a hinge between the terminal 14 and the capacitor plate 16. Capacitor plate 16 flexes about the hinge formed by bight 12 with respect to the terminal 14 which is in a fixed position. Capacitor plate 16, when flexed, is placed in position 18 shown by the dashed line.

A thin layer 20 of thermoplastic film, which may be Kapton, a trademark of the Dupont Corporation, comprising a polyimide material, is cemented to a thin strip 22 of brass or other non-magnetic metal. This strip may have a thickness of about 1/32 inches. The strip 22 is relatively rigid with respect to the strip 10 and remains in fixed position throughout the operation of the capacitor as will be explained. Strips 10 and 22 form the capacitor plates. One end 24 of the strip 22 forms a terminal for an electric circuit while the portion 23 forms the capacitor plate. Tubular glass envelope 26 encapsulates capacitor plates 16 and 23 of the strips 10 and 22. The tube may be hermetically sealed and evacuated. This construction may be similar to that employed for "reed relays." The glass envelope 26 secures the strip 10 at the joint 28 and strip 22 at joint 30.

The insulating layer 20 may be wrapped around the strip 22 instead of being placed on one side. A coil 32 for creating a magnetic field when energized surrounds the envelope 26 at capacitor plates 16 and 23. Selective energizing means is electrically connected to the coil 32 for energizing the coil. The selective energizing means may simply be a switch for connecting and disconnecting a source of power to the coil. It may also include a potentiometer for varying the current through the coil to thereby vary the intensity of the magnetic field.

In the former case, in one position of the switch, the capacitor plate 16 of sheet 10 is close to sheet 22 and preferably is in contact with the insulating layer 20, as shown dashed 18. When in this position, the capacitance is at a maximum. In the other position of the switch, plate 15 is in the position shown in solid line and the capacitance is at a minimum. The normal (unflexed) condition of the plate 16 may be as shown in solid line or alternatively may be as shown by the dashed line. In either case the plate 16 may be moved from its quiescent or normal position to its flexed position by the magnetic field. It is to be understood that the magnetic flux is in a direction to achieve this action. Further, by varying the current applied to the coil 32, the capacitive plate 16 may be flexed to any position between the dashed and solid positions to provide a variable capacitor whose capacitance can be varied in a continuous manner between maximum and minimum values. The selective energizing means 34 can be operated from a remote position by connecting the power source from a remote location. In this case the capacitor could be mounted on a printed circuit board and operated via a switch or potentiometer control at the remote control position. The natural resiliency of the steel plate returns it to the free unflexed position when the magnetic field is removed.

The width of the sheets 10 and 22 may be the same. The area of the overlap of the sheets determines the capacitance of the structure.

The hinge 12 permits the capacitor plate 16 to engage the insulating layer 20 along the entire length of plate 16 and be flat and parallel with the sheet 22. However, such flat and parallel action is not required where the capacitance is not critical. Here the hinge 12 may be omitted and the plate flexed about the joint 28 with envelope 26. The glass envelope 26 may be omitted where a hermetic seal is not required. In that case, the strips 10 and 22 may be fixed at joints 28 and 30 by any suitable mounting arrangement. In any case, the capacitor of FIG. 1 readily can be adapted for mounting to printed circuit boards and other miniaturization implementations.

Figure 2:
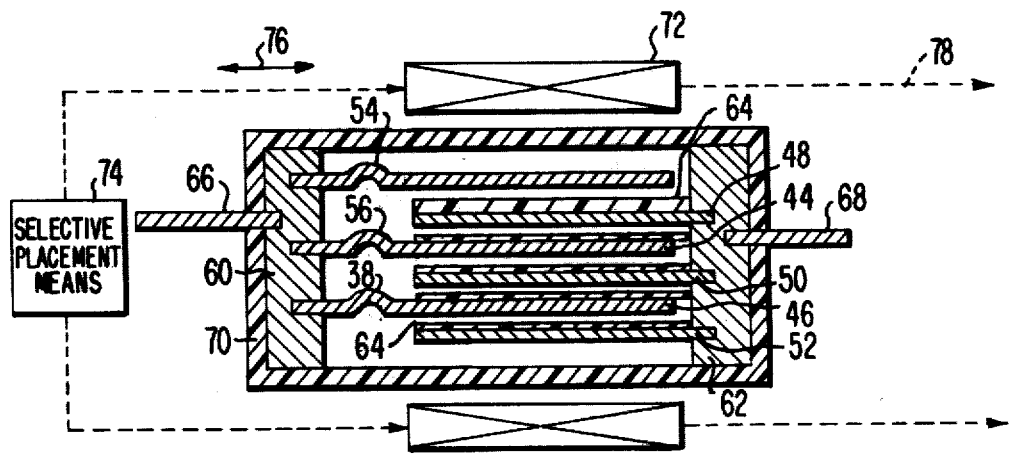
FIG. 2 is a sectional view and schematic block diagram of a second embodiment of the invention.

In FIG. 2 an alternate structure is shown in which the capacitance is increased over that of FIG. 1 for a given width (into the drawing) of the strips 10 and 22, by providing a plurality of interleaved magnetic and non-magnetic capacitor plates. In FIG. 2 strips of magnetic sheet material 42, 44 and 46, such as steel, are interleaved with strips 48, 50 and 52 of non-magnetic material, such as brass.

Strips 42, 44 and 46 are hinged with bights 54, 56 and 58 respectively. One end of each of these strips is mounted in an electrically conductive support 60, such as a slotted steel block. Each strip fits into a separate slot in the block 60 and may be press-fitted or soldered in place. The strips 42, 44 and 46 are uniformly spaced from each other in the present embodiment, but may have other spacings.

The relatively rigid non-magnetic strips 48, 50 and 52 are mounted in corresponding slots in a block 62 of metal. The spacing of strips 48, 50 and 52 is uniform with respect to strips 42, 44 and 46. Relatively thin layers of thermoplastic film 64 are placed between each of the strips. The layers may be cemented to one or the other of the strips or wrapped around, for example, strips 48, 50 and 52. The insulating layers of thermoplastic film may have a thickness of several mils. Each of the strips of magnetic material may have a thickness of about 0.006 inches and the non-magnetic material may have a thickness of about 1/32 inch. A metal terminal 66 is mounted in block 60 and a metal terminal 68 is mounted in block 62. A thermoplastic case in the form of a box 70 houses the structure with the terminals 66 and 68 extending through the box 70. In the alternative, a glass envelope may encapsulate the structure in a manner similar to that shown in FIG. 1.

A permanent magnet 72 is selectively placed over the interleaved capacitor plate portions of the strips 42-52. The selective placement is achieved by a suitable mechanical placement means 74. The permanent magnet 72 may be moved in the directions 76 by the placement means 74 so that in one position the magnet 72 is placed as shown in FIG. 2 and in the second position is placed in the direction of arrow 78 so that there is no magnetic field coupled to the interleaved capacitor plates. The placement means may comprise a solenoid with the permanent magnet connected to the actuating shaft of the solenoid.

With the permanent magnet 72 placed as shown in FIG. 2 the magnetic field flexes the strips 42, 44 and 46 closer to the relatively rigid non-magnetic strips 48, 50 and 52 to increase the capacitance of the structure.

When it is desired to decrease the capacitance, the placement means 74 moves the permanent magnet 72 in the direction 78 so that the magnetic field no longer couples the capacitor plates of the strips. The natural spring action in the steel plates returns them to the unflexed position.

In the alternative, a selectively energized magnetic coil, such as coil 32 of FIG. 1 may be used instead of the permanent magnet 72. In the converse, the selectively energizing means 34 of FIG. 1 may be replaced by the permanent magnet and selective placement means of FIG. 2. The structure of FIG. 2 can be relatively small in size and be adapted for printed circuit board implementations.

Blocks 60 and 62 of FIG. 2 could be insulating material for providing a plurality of separate different capacitors in a single structure. In this case strips 42 and 48 would form a first capacitor, strips 44 and 50 a second, and strips 46 and 52 a third capacitor. Terminals 66 and 68 would be omitted and each strip would be extended through its respective block 60 or 62 to form terminals somewhat similar to the formation of terminals 24 and 14 of FIG. 1. Here the three capacitors so formed would be operated by a single magnet and would track one another's capacitance. Many other variations are possible by altering the width of the capacitor plates, their respective spacings and the flexibility of the flexible plate member. Many other combinations can be provided by different latching arrangements as is known in the "reed relay" art and in which magnetic fields would be selectively operated to open or close certain combinations of capacitor plates in a series of capacitors.

Figure 3:
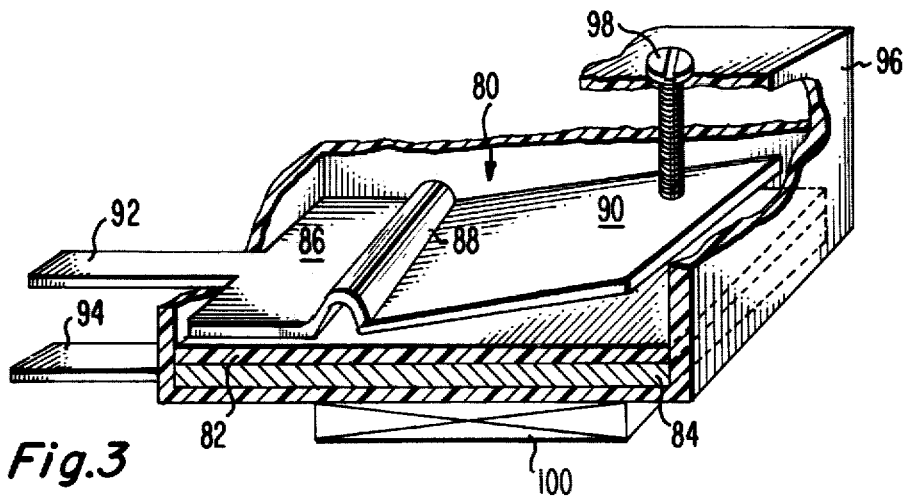
FIG. 3 is a fragmented elevation perspective view of a third embodiment of the invention.

An alternate structure is shown in FIG. 3 in which a relatively wide magnetic flexible strip 80 is mounted directly on an insulating layer 82 at fixed portion 86 which, in turn, is cemented to a relatively rigid non-magnetic strip 84. Bight 88 may be formed in the strip 80 to form a variable capacitor plate 90. In the alternative, bight 88 may be omitted and plate 90 merely flexed with respect to portion 86.

The portion 86 juxtaposed with the non-magnetic strip 84 forms a fixed capacitance while the hinged plate 90 forms a variable capacitance. A narrow extended end of portion 86 forms an electrical terminal 92. A narrow extended end of the non-magnetic strip 84 forms a second terminal 94. The strips 90 and 84 and insulating layer 82 are mounted within a thermoplastic box or housing 96. A screw 98 is mounted to the box and is in threaded engagement with the box for adjusting the spaced position of the capacitor plate 90 with respect to fixed strip 84. A screw such as screw 98 may be used with any of the other embodiments described above in connection with FIGS. 1 and 2. A magnetic coil 100 is adjacent housing 96 and plate 90 for providing a magnetic field to actuate plate 90 toward strip 84 to increase their capacitance. As described above, magnetic coil 100 may be selectively energized with a variable current source or may be substituted with a permanent magnet construction as described in connection with FIG. 2.

The hinge 88 may be omitted in any of the embodiments should the specific requirements of a particular embodiment permit such construction, i.e., the spacing of the plates is not critical.

What is claimed is:

1. A capacitor comprising:
   a cantilevered strip of sheet non-magnetic electrically conductive material supported at one end thereof,
   a layer of electrically insulating material,
   a cantilevered strip of sheet magnetic electrically conductive resilient material supported at one end thereof at least a portion of which is spaced from and juxtaposed with at least a portion of said non-magnetic material in a first spaced position, with said layer between the two sheets, to form a capacitor, and
   means for producing a magnetic field for magnetically displacing said strip of magnetic material to a second different spaced position abutting said layer of insulating material adjacent said non-magnetic material to change the capacitance exhibited by said capacitor to a value determined by the thickness of said insulating material, said non-magnetic strip being relatively rigid and remaining in a fixed position in the presence of the displacement of said strip of magnetic material to a position abutting said layer of insulating material.

2. The capacitor of claim 1 wherein said magnetic material is steel and said non-magnetic material is a copper alloy.

3. The capacitor of claim 1 wherein said magnetic material is 0.006 inches thick spring steel, said non-magnetic material is brass having a thickness of about 1/32 inches, and said layer is a film of thermoplastic.

4. The capacitor of claim 1 further including a glass envelope for enclosing said strips and layer, and terminal means connected to said strips and extending through said glass envelope.

5. The capacitor of claim 1 wherein said means for producing a magnetic field includes a coil of electrically conductive wire adjacent said strips and means for selectively energizing said coil.

6. The capacitor of claim 1 wherein the magnetic strip includes a capacitor portion and a terminal portion, said magnetic strip including a hinge portion between the terminal and capacitor portions.

7. The capacitor of claim 6 wherein said hinge portion includes a bight in said magnetic strip extending across the width of that strip.

8. The capacitor of claim 1 wherein said strips are spaced a first distance exhibiting a first capacitance and a second distance exhibiting a second capacitance greater than said first capacitance.

9. The capacitor of claim 1 wherein said strips are spaced a first distance exhibiting a first capacitance and a second distance exhibiting a second capacitance smaller than said first capacitance.

10. The capacitor of claim 1 wherein said layer is a thermoplastic film cemented to one of said strips.

11. A variable capacitor comprising:
a relatively rigid non-magnetic first conductor strip having a surface and cantilevered at one end thereof;
said first conductor being sufficiently rigid to remain in a fixed position when the insulator sheet below is abutted by a second conductor strip below,
an insulator sheet on said surface;
a magnetic second conductor strip cantilevered at one end thereof formed of resilient material, having a surface facing the surface of said insulator and forming with said first conductor a capacitor, said second conductor having one end portion in fixed position relative to said first conductor and another end portion which is free to move and which in its unflexed condition, is spaced from a cantilevered portion of said first conductor; and
means for applying a magnetic field to said second conductor for moving the second conductor into engagement with said insulator solely over the cantilevered portion of the first conductor, said first conductor at said cantilevered position remaining in relatively fixed position in the presence of said abutted second conductor for changing the spacing between the movable end portion thereof and said first conductor, to thereby set the capacitance exhibited by said capacitor to a value determined by the thickness of said insulator.

12. The capacitor of claim 11 wherein the spacing of said conductors in the unflexed condition is greater than the spacing when flexed.

13. The capacitor of claim 1 further including a plurality of each said strips and layers, said layers each being between a different non-magnetic and magnetic strip; the non-magnetic strips being electrically connected together at one end, the magnetic strips being electrically connected together at one end, the magnetic and non-magnetic strips being interleaved.

* * * * *